G. H. HORLACHER.
RADIATOR.
APPLICATION FILED JAN. 12, 1914.
1,111,225.
Patented Sept. 22, 1914.
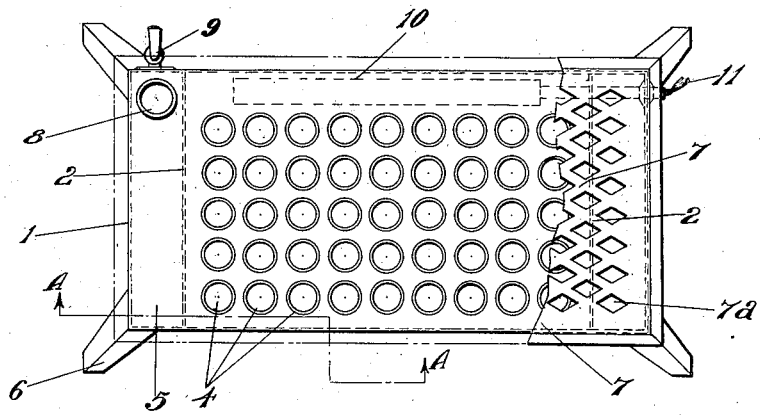
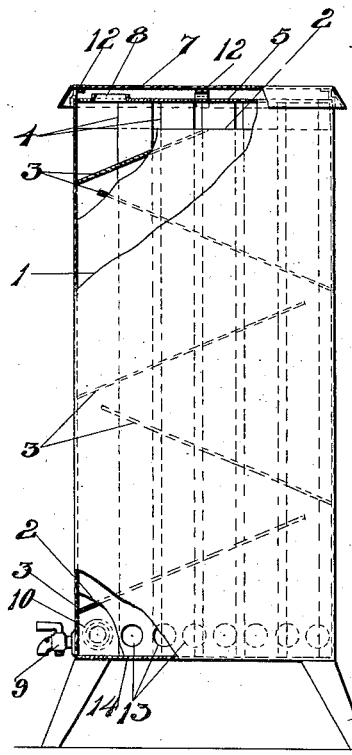
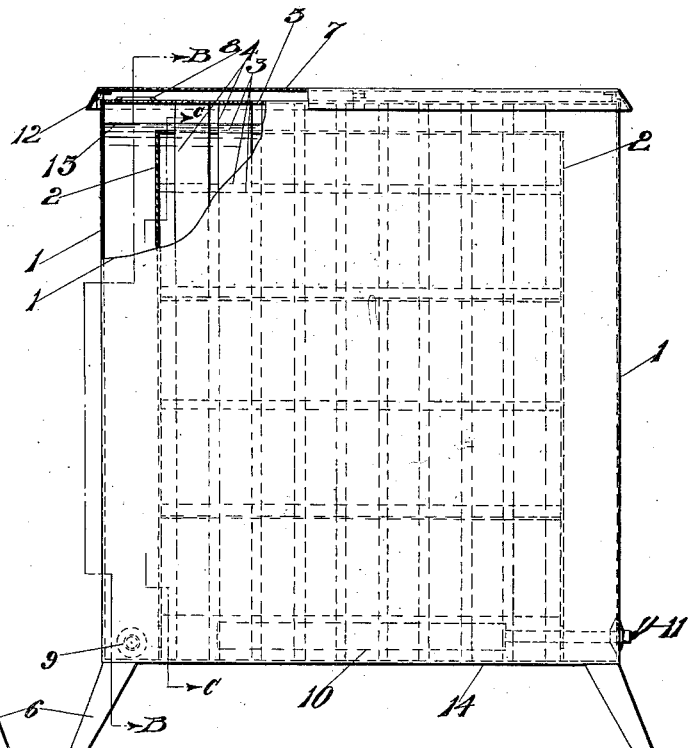

UNITED STATES PATENT OFFICE.

GEORGE H. HORLACHER, OF PORTLAND, OREGON.

RADIATOR.

1,111,225.  Specification of Letters Patent.  Patented Sept. 22, 1914.

Application filed January 12, 1914. Serial No. 811,510.

*To all whom it may concern:*

Be it known that I, GEORGE H. HORLACHER, a citizen of the United States, residing at Portland, in the county of Multnomah and State of Oregon, have invented certain new and useful Improvements in Radiators, of which the following is a specification.

My invention relates to heaters or radiators, and has for its object the production of such a device in which the radiation of heat is promoted by the circulation of air through, and of a liquid within, the radiator or heater, and more particularly in the manner hereinafter set forth.

In the accompanying drawing, Figure 1 is a side elevation of a preferred form of embodiment of my invention, with the upper left hand corner broken away to illustrate interior construction. Fig. 2 is an end elevation of the subject matter of Fig. 1, showing upper and lower left end corners broken away. Fig. 3 is a top plan view of the subject matter of previous figures with a portion of the cover broken away.

Referring to the numerals on the drawing, 1 indicates the outer shell of my heater which consists of a water tight compartment made of any preferred material and of any preferred dimensions. It is closed upon all sides, being provided with a top wall 5 having a filling opening 8 therein.

Within the shell 1 is provided an inner shell 2 of somewhat smaller dimensions than the shell 1, which is made water tight at all its joints. Extending entirely through both compartments and opening through the top plate 5 and the bottom plate 14 of the shell 1 is a series of tubes 4, whereof a suitable arrangement is shown clearly in Fig. 3. The respective tubes 4 form water tight joints with the top and bottom plates of the shell 1, and with the walls of the inner shell 2 where the tubes penetrate. Within the shell 2 I provide a series of oppositely inclined baffling plates 3, each plate 3, being provided with a clear space between it and its neighbor. A preferred arrangement of the baffling plates is clearly shown in dotted lines in Figs. 1 and 2, and also partially shown in section in Fig. 2. A source of heat in the bottom of the shell 1, is indicated in the several figures of the drawing, being indicated by an electric heater 10 which is adapted to derive energy through conductors 11.

13 indicates apertures of communication between the lower part of the shell 2, and the interior of shell 1.

The shell 1 is provided with a drain faucet 9. It may be supported upon legs 6, and is preferably provided with a cover 7, having aperture 7ª in it so as to afford free circulation of air through it, the cover being supported above the surface of the plate 5 as upon studs 12. This cover is intended for ornamental purposes as well as for protection of the top of the shell 1. It may be readily removed whenever required to permit access to the filling opening 8.

The operation of my device is as follows. The heater being duly installed and its conductors 11 in operative communication with a source of electric energy, the faucet 9 being closed, water or other liquid is supplied to the interior of the shell 1 through the filling opening 8, until it reaches a level substantially approximating that indicated by the numeral 15, in Fig. 1 of the drawing. The water introduced through the filling opening 8 enters the interior of the shells 1 and 2, filling them completely and coming into contact with all of the tubes 4. Electrical energy being supplied through the conductors 11 to heat the member 10, the water within the shell 1 is thereby set into circulation. In its circulation, currents of the water are deflected by the baffling plates 3 in such a manner as to distribute a uniform degree of heat throughout the entire liquid contents of the shells 1 and 2, and about the tubes 4 surrounded thereby.

The volume of air in a room is, in consequence of its circulation through the tubes 4, brought into operative proximity to the heated liquid surrounding those tubes and is kept thereby warmed by constant circulation.

What I claim is:

The combination with a source of heat, of inner and outer shells adapted to contain a liquid, tubes extending from top to bottom through both shells, and baffling plates within the inner shell.

In testimony whereof I affix my signature in the presence of two witnesses.

GEORGE H. HORLACHER.

Witnesses:
 E. EARL FEIKE,
 H. A. ARMSTRONG.